United States Patent [19]

Minami

[11] Patent Number: 5,091,921
[45] Date of Patent: Feb. 25, 1992

[54] DIRECT CONVERSION RECEIVER WITH DITHERING LOCAL CARRIER FREQUENCY FOR DETECTING TRANSMITTED CARRIER FREQUENCY

[75] Inventor: Yoichiro Minami, Tokyo, Japan

[73] Assignee: NEC Corporation, Tokyo, Japan

[21] Appl. No.: 511,696

[22] Filed: Apr. 20, 1990

[30] Foreign Application Priority Data

Apr. 20, 1989 [JP] Japan .................................. 1-100617
May 18, 1989 [JP] Japan .............................. 1-57855[U]
Oct. 25, 1989 [JP] Japan .................................. 1-277711

[51] Int. Cl.$^5$ ........................................... H04L 27/14
[52] U.S. Cl. ...................................... 375/88; 375/97; 329/302
[58] Field of Search ....................... 375/45, 80, 82, 83, 375/84, 85, 88, 104, 97; 329/300, 302, 303; 328/134, 141; 333/215

[56] References Cited

U.S. PATENT DOCUMENTS

| | | | |
|---|---|---|---|
| 4,193,033 | 3/1980 | Voorman | 333/215 |
| 4,322,851 | 3/1982 | Vance | 375/88 |
| 4,475,219 | 10/1984 | Puckette | 375/82 |
| 4,517,519 | 5/1985 | Mukaiyama | 375/88 |
| 4,521,892 | 6/1985 | Vance et al. | 329/302 |
| 4,571,738 | 2/1986 | Vance | 329/303 |
| 4,672,636 | 6/1987 | Marshall et al. | 375/97 |
| 4,716,579 | 12/1987 | Masterton | 375/88 |
| 4,752,742 | 6/1988 | Akaiwa | 329/303 |

Primary Examiner—Stephen Chin
Attorney, Agent, or Firm—Sughrue, Mion, Zinn Macpeak & Seas

[57] ABSTRACT

An FSK receiver includes first and second channel paths to which the received FSK signals are applied. Each channel path includes a mixer circuit, a low-pass filter connected to the mixer circuit, and a limiting amplifier connected to the low-pass filter. A voltage-controlled oscillator generates a local carrier and a phase shifter applies its output to the mixer circuits with a 90° phase difference therebetween. A frequency detector is coupled to one of the limiting amplifiers for generating a signal representative of the deviation frequency minus the offset frequency of the received FSK signal. An average circuit detects an average value of the signal from the frequency detector. A comparator circuit detects whether the frequency representative signal lies in or outside of the neighborhood of the average value. A ramp voltage of constant amplitude is periodically generated if the signal is detected as lying outside of the neighborhood and maintained at an instantaneous value if the signal is detected as lying in the neighborhood. The voltage-controlled oscillator is responsive to the ramp generator to control the frequency of the local carrier in search of the transmitted carrier frequency.

26 Claims, 5 Drawing Sheets

FIG. 3
AUTOMATIC FREQUENCY CONTROLLER 6

DIRECT CONVERSION RECEIVER WITH DITHERING LOCAL CARRIER FREQUENCY FOR DETECTING TRANSMITTED CARRIER FREQUENCY

BACKGROUND OF THE INVENTION

The present invention relates to a direct conversion receiver in which the radio frequency is directly converted to a baseband signal.

In a conventional superheterodyne receiver, high-frequency and intermediate-frequency filters both of high-selectivity type are required to remove image frequencies. To achieve small size and low assembly cost, direct frequency conversion technique has been employed in a homodyne receiver in which the radio frequency of the received signal is converted directly to a baseband frequency in a manner as shown and described in U.S. Pat. Nos. 4,193,034 and 4,254,503. With the direct conversion receiver, orthogonal, or quadrature local carrier frequencies are tuned to the transmitted carrier to provide zero intermediate frequency (homodyne) and baseband signals are detected by mixers as beats in quadrature between the transmitted carrier and the local carriers in quadrature. The outputs of the mixers are passed through low-pass filters to remove noise, and fed through limiting amplifier stages a discriminator. Because of the zero intermediate frequency, no need exists to remove image frequencies which are present in conventional superheterodyne receivers in which high-selectivity filters are used in the high-frequency and intermediate frequency amplifiers. Another advantage of the zero intermediate frequency is that the channel filter for attenuating signals from adjacent channels can be implemented with low-frequency active filters on integrated circuits.

However, one disadvantage is that the bandwidth in which acceptable level of sensitivity can be obtained is narrow. Since the amount of information contained in a single bit, $E_B$, is given by $E_B = 2 \times F_D/B_R$, (where $F_D$ is maximum frequency deviation as a modulating digital signal varies between a mark and a space, and $B_R$ represents the transmission speed), and the beat frequency $F_B$ is represented by $F_B = (F_C \pm F_D) - F_L$ (where $F_C$ and $F_L$ are the transmitted carrier frequency and the local carrier frequency, respectively). If there is no difference between $F_C$ and $F_L$, then the beat frequency $F_B$ is equal to the maximum frequency deviation $F_D$ and the marks and spaces have equal values for information quantity $E_B$. However, if there is a frequency offset $\Delta F$ between the transmitted and local carriers due to tuning errors, beat frequency $F_B$ is given by $F_B = \pm F_D - \Delta F$. Therefore, beat frequency $F_B$ varies between $F_D - \Delta F$ for a "mark" and $F_D + \Delta F$ for a "space". This implies that information quantity $E_B$ iss les for "marks" than for "spaces", and hence, a low signal to noise ratio.

SUMMARY OF THE INVENTION

It is therefore an object of the present invention to provide an orthogonal detection receiver having a wide range of acceptable sensitivity.

This object is obtained by fluctuating the local carrier frequency in search of the transmitted carrier frequency whether the deviation frequency of the received signal (or the frequency of the baseband signals) lies outside of a predetermined range and holding the local carrier frequency if the deviation frequency lies within the predetermined range.

According to the present invention, there is provided a receiver for receiving a digitally modulated radio signal and including a voltage-controlled crystal oscillator nominally running at the transmitted frequency, a mixer circuit for directly converting the frequency of the received signal to a baseband frequency. A low-pass filter is connected to the mixer circuit, and a limiting amplifier is connected to the low-pass filter. A frequency detector is coupled to the limiting amplifier for generating a signal representative of the deviation frequency minus the offset frequency of the rceived signal. An average circuit detects an average value of the signal from the frequency detector and supplies it to a comparator circuit for detecting whether the frequency representative signal lies in or outside of the neighborhood of the average value. A ramp generator is provided for periodically generating a ramp voltage of constant amplitude if the signal is detected a lying outside of the neighborhood and holding the ramp voltage at an instantaneous value if the signal is detected as lying in the neighborhood. The voltage-controlled crystal oscillator is responsive to an output voltage of the ramp generator to control the frequency of the local carrier.

Preferably the receiver includes a phase-locked loop for controlling the voltage-controlled crystal oscillator. The phase-locked loop comprises a second voltage-controlled oscillator of LC network which is responsive to the output voltage of the ramp generator. First and second variable frequency dividers are connected respectively to the outputs of the first voltage-controlled crystal oscillator and the second voltage-voltage controlled oscillator. A phase detector detects a phase difference between the output signals of the first and second variable frequency dividers. A low-pass filter applies a filtered output of the phase detector to the second voltage-controlled oscillator. The dividing factors of the first and second variable frequency dividers are established by a digital control signal. This eliminates the need for keeping many different types of crystal resonators for assembly and maintenance purposes.

In addition, power savings can be obtained by cutting off one of the channel paths if the frequency representative signal is detected as lying outside of the neighborhood of the average value.

BRIEF DESCRIPTION OF THE DRAWINGS

The present invention will be described in further detail with reference to the accompanying drawings, in which.

DETAILED DESCRIPTION

Figure 1:
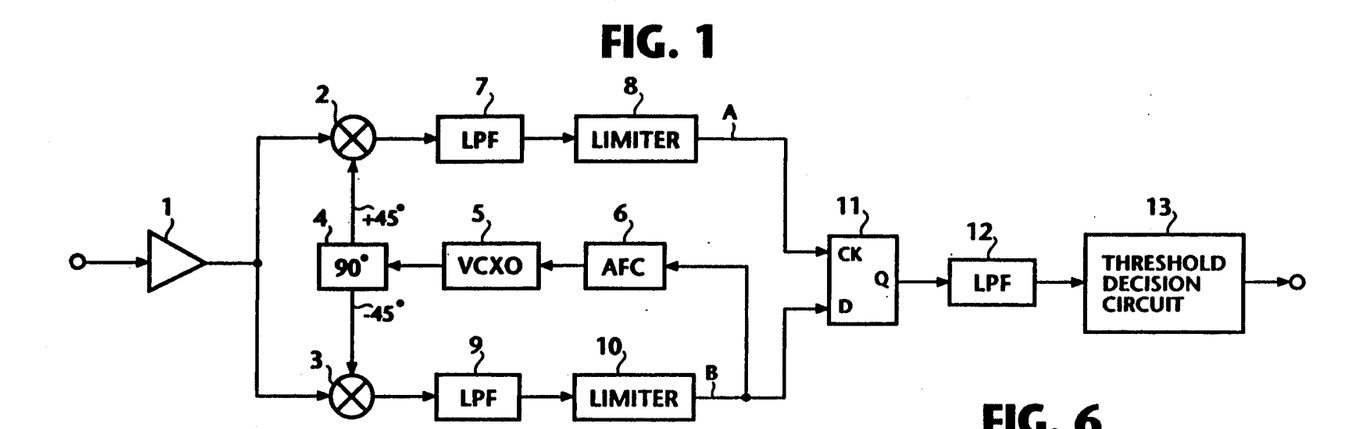
FIG. 1 is a block diagram of an orthogonal detection radio receiver according to a first embodiment of the present invention.

Referring now to FIG. 1, there is shown a radio receiver for frequency shift keyed (FSK) signals on an RF carrier. Received radio signals $F_C \pm F_D - \Delta F$, where $F_C$ is a carrier wave frequency, $F_D$ is the FSK modulation deviation and $\Delta F$ is the frequency offset, are amplified by a high-frequency amplifier stage 1 and fed to mixers 2 and 3 to which local carriers in quadrature are supplied from a 90° phase shifter 4. The output of a voltage-controlled crystal oscillator (VCXO) 5 is fed to the shift 4 where it is shifted by +45° and −45° to generate local carriers in quadrature. The outputs of mixer circuits 2 and 3 are fed to low-pass filters 7 and 9, respectively. The low-pass filtered signals are then fed to high-gain limiting amplifier stages 8 and 10, respectively. The output signal A of limting amplifier stage 8 is fed to the clock input of a digital demodulator, or D-type flip-flop 11, as an in-phase channel signal, and the output signal B of limiting amplifier stage 10 is fed to the D input of the flip-flop 11 as a quadrature channel signal. The signal B is further fed to an automatic frequency controller 6 whose output is applied to the local oscillator 5.

Figure 2:
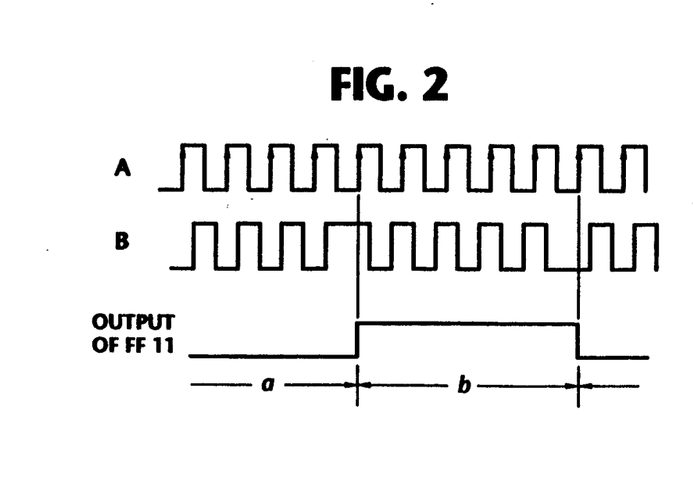
FIG. 2 is waveform diagram associated with the D-type flip-flop of FIG. 1.

If the input signal is in the 'mark' condition, i.e., nominally $F_D$-kHz below the local oscillator frequency, the outputs of the mixer stages 2 and 3 will consist of two sine waves at $F_D$ kHz in quadrature. After the limiting amplifiers 8 and 10, the data at the clock and D inputs of flip-flop 11 are thus $F_D$-kHz square waves in quadrature as shown in part a of FIG. 2. If the D-type flip-flop 11 is positive-edge clocked, then the Q output will be constant logical 0 condition. If the input signal is in the 'space' condition, i.e., $F_D$-kHz above the local oscillator frequency, the relative phase of the data at the flip-flop 11 inputs has shifted by 180° as indicated in part b of FIG. 2, and the Q output of flip-flop 11 is now a logical 1.

The output of D-type flip-flop 11 is passed through a low-pass filter 12 to remove noise and applied to a threshold decision circuit 13 in which any ambiguities between two significant logic levels are eliminated.

Figure 3:
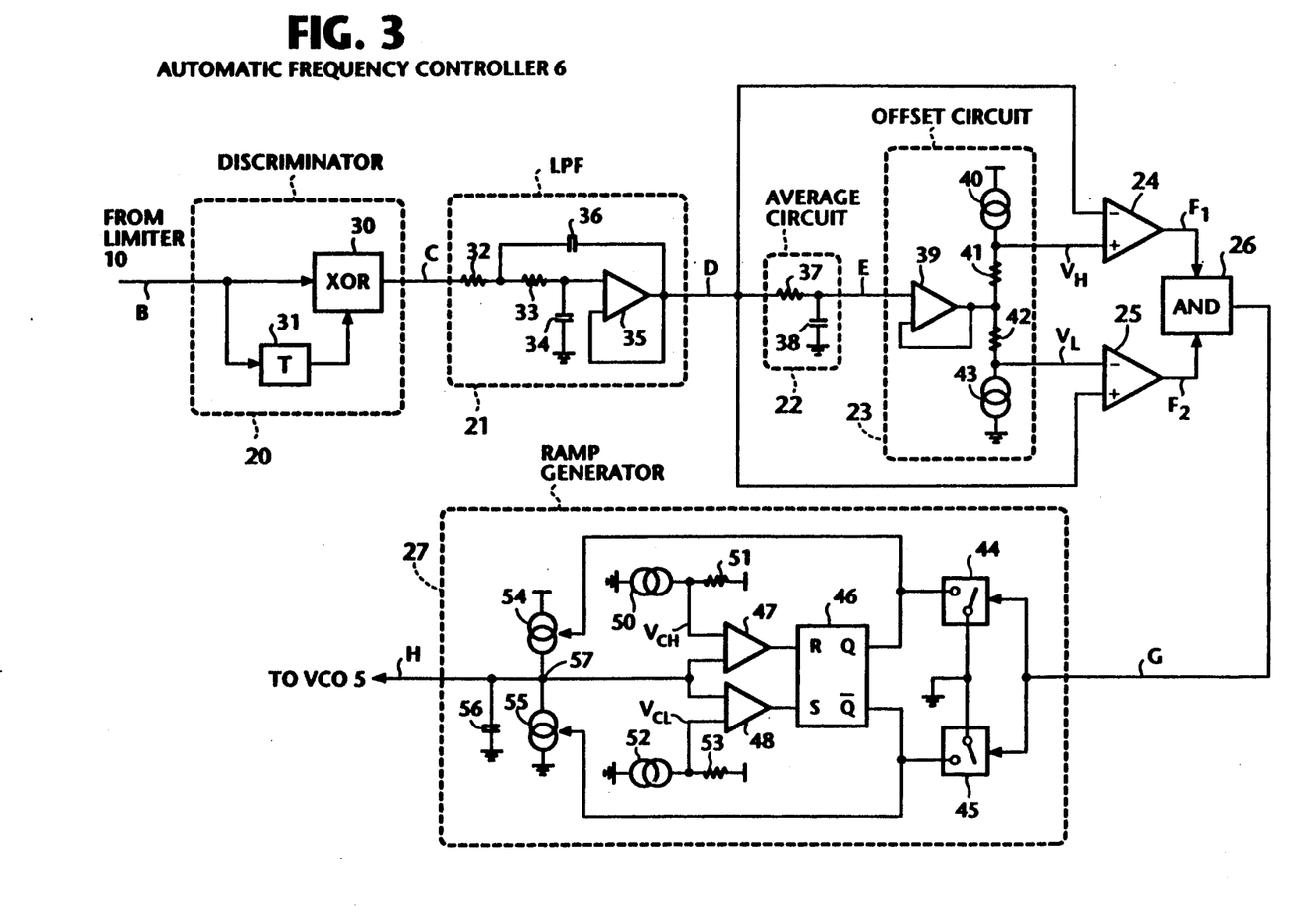
FIG. 3 is a circuit diagram of the AFC circuit of FIG. 1.
Figure 4:
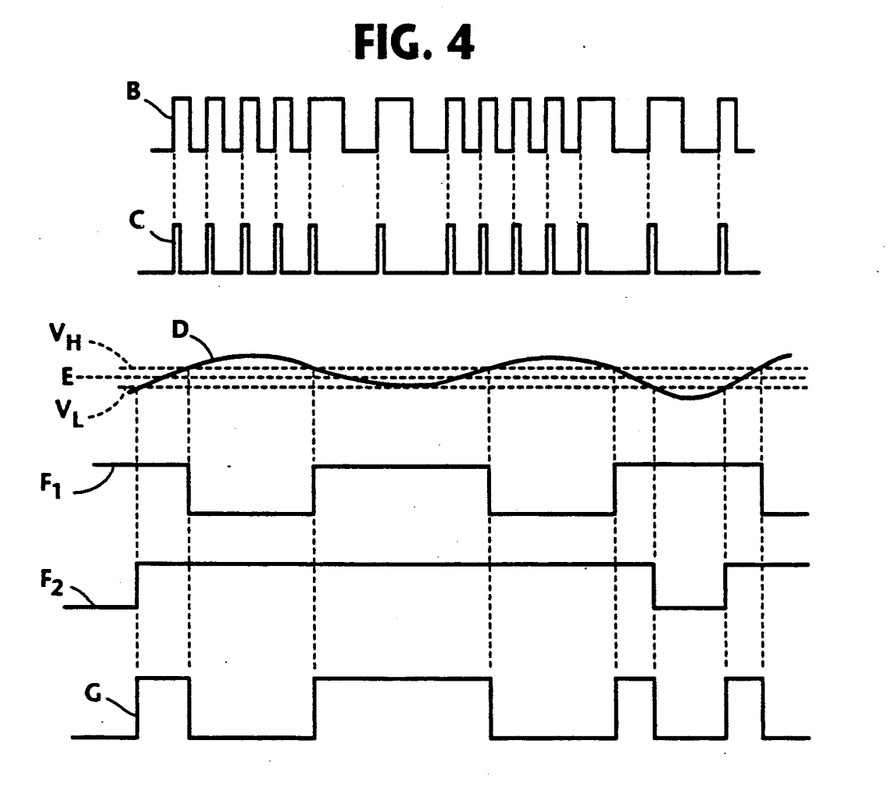
FIG. 4 is a waveform diagram associated with the circuit of FIG. 3.

In FIG. 3, the AFC circuit 6 generally comprises a discriminator 20, a low-pass filter 21, an average circuit 22, an offset circuit 23, a pair of comparators 24, 25, and AND gate 26 and a ramp generator 27. Discriminator 20 is essentially an edge detector comprising an exclusive OR gate 30 which receives a direct version of the output signal B from the output of limting amplifier stage 10 and a delayed version of the signal B via a delay line 31 with a delay period T. As illustrated in FIG. 4, the output of discriminator 20 is in the form of pulses C of duration T which occur at the leading edge of each output pulse of the signal B. The output signal C from discriminator 20 is applied to low-pass filter 21 which includes an RC network including elements 32~34 through which the input signal C is fed to a voltage follower 35, the output of which is coupled by a feedback capacitor 36 to a junction between resistors 32 and 33. The RC low-pass filter 21 produces a voltage D whose amplitude is representative of the frequency $\pm F_D - \Delta F$ of the signal B. The output D of the low-pass filter 21 is then fed to average circuit 22 which is formed by a first-order RC integrator comprising a resistor 37 and a capacitor 38 coupling the resistor 37 to ground. The time constant of this RC integrator is much greater than the reciprocal of the transmission speed $B_R$. The output E of the average circuit represents an average value of the frequency of signal B over time. Since the frequency of the signal B varies between $F_D - \Delta F$ and l-$F_D - \Delta F$l, average circuit 22 removes the offset component $\Delta F$ producing an output voltage E representative of the deviation frequency $F_D$. The voltage E from average circuit 22 is applied through a voltage follower 39 of the offset circuit 23 to a junction between resistors 41 and 42 which are series-connected between constant current sources 40 and 43 which are, in turn, coupled to a voltage source and ground, respectively. The effect of this offset circuit is to add to the average voltage E a positive offset voltage $+\Delta V$ to generate a high reference voltage $V_H = E - \Delta V$ at a junction between constant current source 40 and resistor 41 and a negative offset voltage $-\Delta F$ to generated a low reference voltage $V_L = E - \Delta V$ at a junction between constant current source 43 and resistor 42.

The high reference voltage $V_H$ is applied to the positive input of a comparator 24 for making a comparison with the average voltage E and the low reference voltage $V_L$ is applied to the negative input of a comparator 25 for comparison with the average value E. As shown in FIG. 4, comparator 24 generates a high voltage output $F_1$ when the average value E is lower than the reference voltage $V_H$, while comparator 25 produces a high voltage output $F_2$ when the average value E is higher than the reference value $V_L$. The outputs of comparators 24 and 25 are applied to AND gate 26 to produce coincidence pulses G. It is seen from FIG. 4 that the output of AND gate 26 is high when the instantaneous value of signal D lies in the range $\Delta V$ on each side of the average value E. Since the signal D can be given by $K \times \Delta F$, where K ($= V/kHz$) is the sensitivity of discriminator 20, the output of AND gate 26 is high if $K \times \Delta F$ is smaller than $\Delta V$. Assume that K=10 mV/kHz and $\Delta V$ is 10 mV, a coincidence pulse G is generated when $\Delta F$ is lower than 1 kHz.

Coincidence pulses G are supplied to ramp generator 27 as a switching pulse. Ramp generator 27 is constructed of a pair of grounding circuits, or switches 44 and 45 which respond to the coincidence pulse G by grounding the Q and $\overline{Q}$ outputs of an SR latch 46. The outputs of SR latch 46 are supplied as on-off signals respectively to constant current sources 54 and 55 which are connected between the voltage source and ground. A capacitor 56 is connected to a junction 57 between constant current sources 54 and 55. When the Q output of SR latch 46 is high, constant current source 54 charges the capacitor 56 to develop a voltage at junction 57. When the $\overline{Q}$ output is high, constant current source 55 presents a short-circuit path across the capacitor 56 to allow it to quickly discharge. A comparator 47 is provided for making a comparison with the voltage at junction 57 with a higher reference voltage $V_{CH}$ developed by a reference voltage source comprising a constant current source 50 and a resistor 51. A comparator 48 compares the voltage at junction 57 with a lower reference voltage $V_{CL}$ developed by a circuit formed by a constant current source 52 and a resistor 53. The outputs of comparators 47 and 48 are fed to the reset and set inputs of SR latch 46, respectively. If the voltage at junction 57 exceeds the higher threshold $V_{CH}$, SR latch 46 is reset and the $\overline{Q}$ output goes high to discharge capacitor 56. If the voltage at junction 57 drops below the lower threshold $V_{CL}$, SR latch 46 is set and the Q output goes high to switch constant current source 54 to a low-impedance state, causing capacitor 56 to be charged, developing a ramp voltage H (see FIG. 5). In the absence of a coincidence pulse G, this process is repeated at a rate higher than the rate at which the signal is received so that there is at least one ramp voltage during a data bit period. Under this condition the ramp generator is said to be in a free running (hunting) mode in search of an optimum local carrier frequency. When a coincidence pulse G is supplied, constant current sources 54 and 55 are both switched to high-impedance state, keeping capacitor 56 in an open circuit to hold a voltage obtained at the instant the pulse C is applied. The ramp generator under this condition is said to be in a hold mode to lock the local carrier frequency at the optimum frequency.

Figure 5:
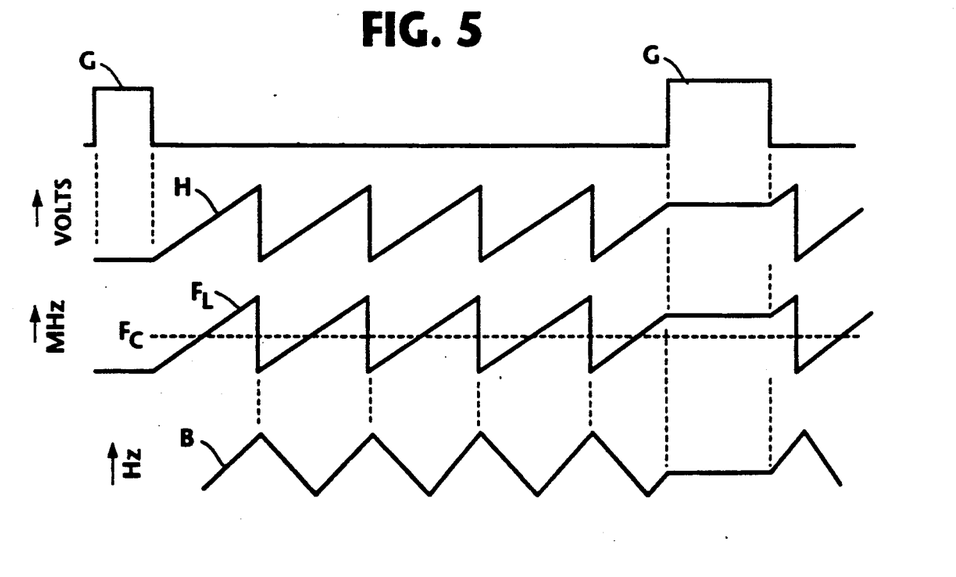
FIG. 5 is a waveform diagram illustrating relationships between the output of the ramp generator, the local carrier and the Q-channel output during the hunting and hold modes of the ramp generator.

The voltage developed by capactior 56 is supplied to the control input of VCXO 5, and therefore, the local carrier frequency $F_L$ is varied, or "dithered" between the high and low sides of the transmitted carrier frequency $F_C$ as shown in FIG. 5. Since the AFC circuit 6 has no way of determining on which side the beat frequency $F_B$ is offset, the periodic variation of local carrier frequency $F_L$ has the effect of detecting a point at which the offset can be minimized. As a result, the baseband signals A and B are caused to periodically vary in frequency in a manner as shown in FIG. 5. Therefore, for each data bit period there is at least one coincidence pulse G, i.e., a situation in which the difference between the transmitted and local carrier frequencies $F_C$ and $F_L$ is reduced to a level below a prescribed value. It is seen therefore that, when a coincidence pulse G is generated, ramp generator 27 switches to a hold mode and the local carrier frequency $F_L$ is controlled with a voltage developed across capacitor 56 which is held constant until the local carrier frequency again deviates from the transmitted carrier and the signal D goes beyond the range of thresholds $V_H$ and $V_L$, reinitiating a search for the transmitted carrier frequency.

Figure 6:
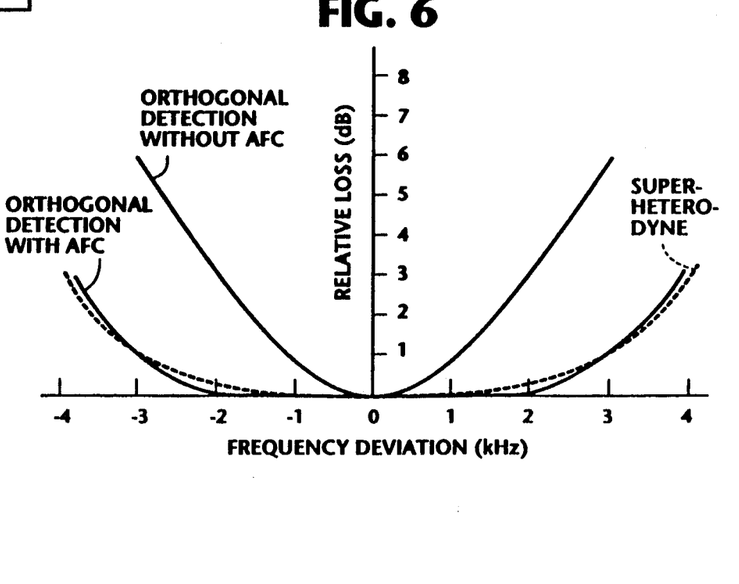
FIG. 6 is a graph showing the sensitivity characteristic of the present invention in comparison with those of a conventional superheterodyne receiver and a conventional orthogonal detection receiver with no automatic frequency control.

As shown in FIG. 6, the dithered automatic frequency control on VCXO 5 results in an improved sensitivity which can be comparable with the sensitivity attained by superheterodyne receivers. Namely, the present invention improves the 1-dB sensitivity range of the conventional homodyne receiver from the current 2-kHz range to a 6-kHz range.

While the homodyne principle is advantageous for small volume, the local carrier frequency of each radio receiver must be tuned to a particular value to which it is assigned, and different types of crystal resonators must therefore be prepared for inventory control for assembly and maintenance purposes.

Figures 7, 8A, 8B:
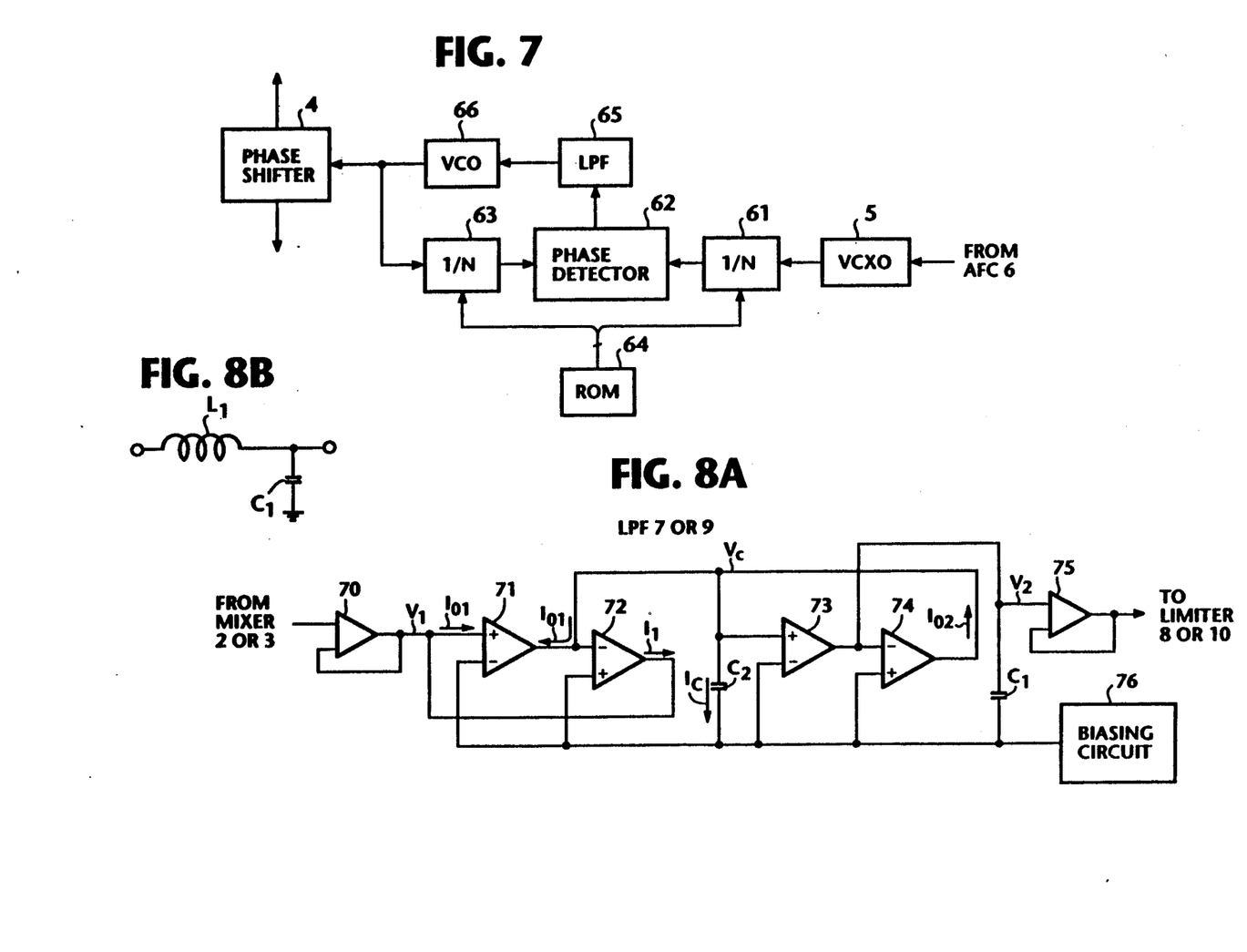
FIG. 7 is a block diagram of a phase-locked loop according to a modified embodiment of the invention.
FIG. 8A is a circuit diagram of the low-pass filters of FIG. 1.
FIG. 8B is an equivalent circuit of the gyrator circuit of FIG. 8A.

To reduce the assembly and maintenance costs, the output signal of voltage-controlled crystal oscillator 5 of FIG. 1 is preferably controlled in a phase-locked loop in a manner as shown in FIG. 7. In FIG. 7, the output voltage from AFC circuit 6 is applied to the control input of voltage-controlled crystal oscillator 5. The output of VCXO 5 is applied to a programmable counter, or variable frequency divider 61 which is preset to an arbitrary value N by a binary controls signal supplied from a read-only memory 64 to count the VCXO output pulse and divide its frequency by the factor N. The output of frequency divider 61 is applied to one input of a phase detector 62 to the second input of which is applied the output of a second variable frequency divider 63 which is also preset to N by the output of ROM 64. The output of phase detector 62 is filtered by a low-pass filter 65 and supplied to a voltage-controlled oscillator 66 of LC (inductor-capacitor) network. The output of VCO 66 is fed to the second frequency divider 63 to divide its frequency by N. The output signal of VCO 66 is supplied to phase shifter 4 as a local carrier.

Since VCXO 5 is driven with a ramp voltage when the local carrier generated by VCO 66 goes beyond a prescribed range, the frequency of VCXO 5 is linearly varied over a predetermined range in search of the transmitted carrier frequency. This results in a corresponding variation in the output of phase detector 62 and drives VCO 66 in such a direction that the output of phase detector 62 reduces to zero. Therefore, the local carrier frequency supplied to phase shifter 4 varies linearly corresponding to the linear variation of the output of VCXO 5. Therefore, if the output of ROM 64 is of 14-bit wide, the local carrier frequency of each receiver can be chosen to correspond to one of $(2^{15}-1)$ possible frequency values.

Another disadvantage of the homodyne receiver is that, since the input signals to low-pass filters 7 and 9 are the baseband signals which lie in the frequency range of several kilohertz, implementation of these low-pass filters with an active filter of ladder network would require the use of capacitors of few thousands picofarads to several tens of thousands picofarads. Due to the impossibility of circuit integration, the capacitors of these sizes with the necessary resistors are mounted on a separate board and connected by lead wires to a voltage follower which is created on an integrated circuit chip as part of the low-pass filter.

To overcome this disadvantage, each of the low-pass filters 7 and 9 comprises a gyrator filter as shown in FIG. 8A. The equivalent circuit of the gyrator filter is shown in FIG. 8B as comprising an inductance $L_1$ and a capacitance $C_1$. In FIG. 8A, the gyrator filter comprises an input voltage follower 70, transconductance amplifier stages 71, 72, 73 and 74, and an output voltage follower 75. Transconductance amplifier stages 71~74 are biased by a biasing circuit 76. The output signal from mixer 2 or 3 is fed through input voltage follower 70 to the noninverting input of transconductance amplifier stage 71 of which the inverting input is coupled to biasing circuit 76. The output of transconductance amplifier 71 is coupled to the inverting input of transconductance amplifier 72 whose noninverting input is coupled to the biasing circuit 76. The output of the second transconductance amplifier 72 is fed back to the noninverting input of the first transconductance amplifier 71. In a manner similar to the first and second transconductance amplifiers 71 and 72, the output of transconductance amplifier 71 is coupled to the noninverting input of amplifier 73 whose output is fed to the inverting input of the fourth transconductance amplifier 74. The output of amplifier 74 is fed back to the noninverting input of amplifier 73. The output of third transconductance amplifier 73 is coupled through the output voltage follower 75 to the limiter 8 or 10. The inverting and noninverting inputs of amplifiers 73 and 74 are coupled to the biasing circuit 76. To simulate the inductance $L_1$, a capacitor $C_2$ is connected across the noninverting and inverting inputs of amplifier 73. The capacitor $C_1$ of FIG. 8B is connected across the input of voltage follower 75 and the biasing potential.

With the circuit configuration just described, the following relations hold:

$$I_{01} = G \cdot V_1 \quad (1)$$

$$I_{02} = G \cdot V_2 \quad (2)$$

$$I_1 = G \cdot V_c \quad (3)$$

$$V_c = I_c / j\omega C_2 \quad (4)$$

$$I_{02} = I_{01} + I_c \quad (5)$$

where, $I_{01}$ = input current to the noninverting input of amplifier 71;
$I_{02}$ = output current from amplifier 74;
$I_1$ = output current from amplifier 72;
$I_c$ = current flowing through capacitor $C_2$;
$G$ = the transconductance of each of the transconductance amplifiers 71 to 74;
$V_1$ = voltage at the noninverting input of amplifier 71;
$V_2$ = voltage at the input of voltage follower 75; and
$V_c$ = voltage at the output of amplifier 74.

Substituting Equations (4) and (5) into Equations (1) to (3) gives:

$$(V_1 - V_2)/I_1 = j\omega C_2 / G \cdot G \quad (6)$$

By letting $L_1 = C_2/G \cdot G$, Equation (6) can be represented as:

$$(V_1 - V_2)/I_1 = j\omega L_1 \quad (7)$$

Therefore, the inductance $L_1$ of FIG. 8B can be simulated with the four transconductance amplifiers 71 to 74 and capacitor $C_2$ of FIG. 8A.

Figure 9:
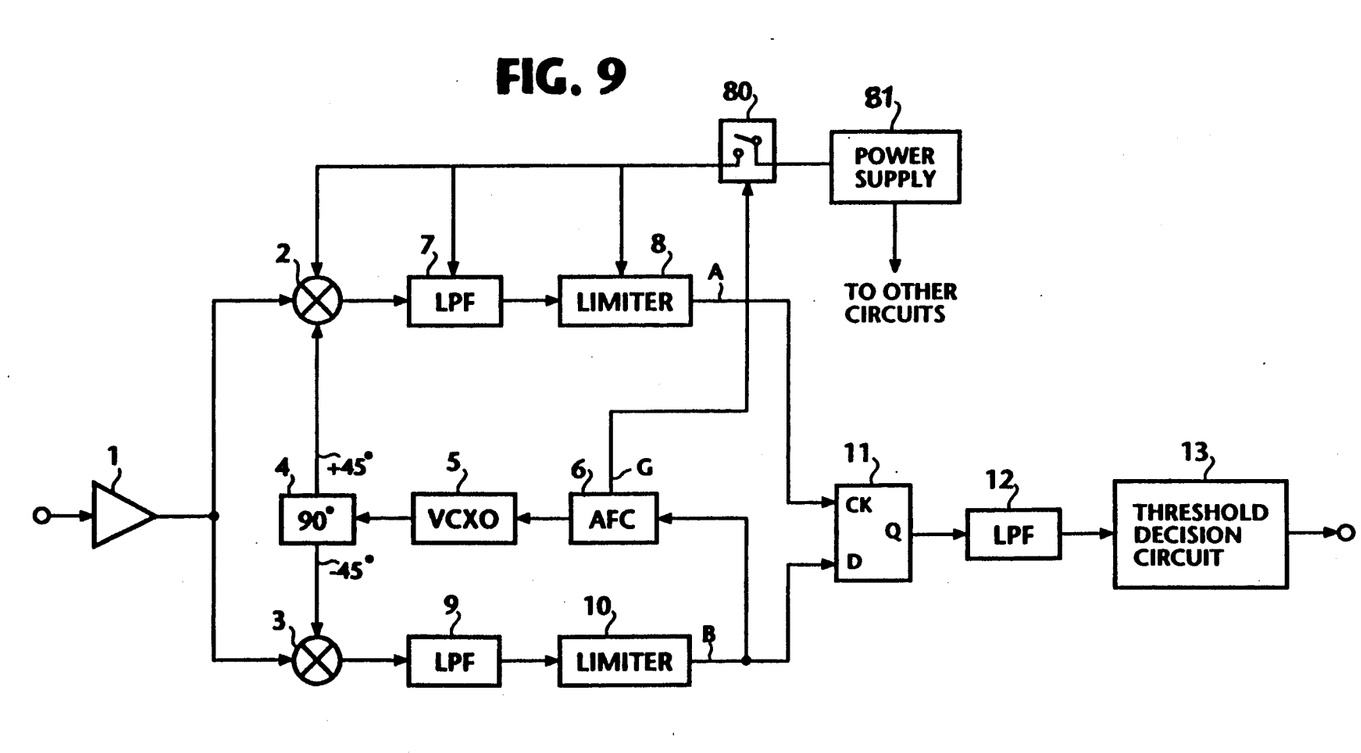
FIG. 9 is a block diagram of a power saving receiver according to a further embodiment of the present invention.

A still another disadvantage of orthogonal detection is that since orthogonal detection requires two systems for in-phase and quadrature signals its power consumption is larger than that of superheterodyne receivers. To reduce power consumption, power supplies to one of the systems of the orthogonal detection receiver are cut off when the AFC 6 is in a hunting mode. FIG. 9 is a block diagram of another embodiment which employs a power saving circuit. This power saving circuit comprises a power control switch 80 which cuts off the power line from a power voltage source 81 to mixer 2, low-pass filter 7 and limiter 8 of the in-phase channel during the time the ramp generator 27 of AFC 6 is in a hunting mode (the absence of a coincidence pulse G) and which supplies power during the time the ramp generator 27 is in a hold mode (the presence of a coincidence pulse G). Since the fact that ramp generator 27 is in a hunting mode indicates that the received signal is very weak or no signals are received at all, it is sufficient for the receiver to operate with one channel, i.e., with the quadrature-channel, under such circumstances.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A receiver for receiving a digitally modulated radio frequency signal at a transmitted carrier frequency, which has a frequency deviation, comprising:
    a first voltage-controlled oscillator for generating a first local carrier;
    a mixer circuit for mixing the received signal with said first local carrier for converting the frequency of the received radio signal to a baseband frequency;
    a low-pass filter for filtering a baseband signal from said mixer circuit;
    a limiting amplifier connected to an output of said low-pass filter;
    a frequency detector coupled to an output of said limiting amplifier for generating a signal representative of a variation frequency of the received radio signal, said variation frequency equaling the deviation frequency of the transmitted carrier frequency minus an offset between the transmitted and first local carrier frequencies;
    an average circuit for averaging the signal from the frequency detector to produce a signal representative of the deviation frequency of the received radio signal;
    a comparator circuit for detecting whether the signal from the frequency detector lies in or outside of the neighborhood of a frequency represented by the signal from the average circuit; and
    a ramp generator for periodically generating a ramp voltage of constant amplitude when the signal from the frequency detector is detected as lying outside of said neighborhood and holding said ramp voltage at an instantaneous value when said signal is detected as lying in said neighborhood, said first voltage-controlled oscillator being responsive to an output voltage of said ramp generator to control the frequency of said first local carrier.

2. A receiver as claimed in claim 1, wherein said first voltage-controlled oscillator is a voltage-controlled crystal oscillator.

3. A receiver as claimed in claim 1, wherein said comparator circuit comprises:
    an offset circuit for establishing high and low reference voltages respectively above and below a voltage represented by the signal from the average circuit; and
    means for detecting when said signal from the frequency detector lies in or outside or a range between said high and low reference voltages.

4. A receiver as claimed in claim 1, wherein said frequency detector comprises an edge detector for generating a pulse at a transition of each pulse supplied from said limiting amplifier, and a second low-pass filter for low-pass filtering said pulse generated by said edge detector.

5. A receiver as claimed in claim 1, wherein said average circuit comprises a first-order integrator having a time constant greater than a reciprocal of transmission rate of the received signal.

6. A receiver as claimed in claim 1, wherein said ramp generator is oscillated so that there is at least one ramp voltage during a symbol interval.

7. A receiver as claimed in claim 6, wherein said ramp generator comprises:

a capacitor connected to the control input of said first voltage-controlled local oscillator;

first and second comparators for comparing a voltage developed in said capacitor with high and low thresholds and generating a first signal when said voltage is higher than the high threshold and a second signal when said voltage is lower than the low threshold;

a latch circuit for assuming a first logic state in response to said first signal and a second logic state in response to said second signal;

series-connected first and second constant current sources respectively responsive to said first and second logic states, a junction between said first and second constant current sources being coupled to said capacitor for causing it to be charged and discharged in response to said logic states; and switch means for causing said constant current sources to present an open circuit to said capacitor when said signal is detected as lying in said neighborhood.

8. A receiver as claimed in claim 2, further comprising a phase-locked loop, comprising:

a second voltage-controlled oscillator for generating a second local carrier based upon said first local carrier;

first and second variable frequency dividers connected respectively to outputs of the first voltage-controlled crystal oscillator and said second voltage-controlled oscillator;

a phase detector for detecting a difference in phase between outputs of the first and second variable frequency dividers;

a low-pass filter for applying a filtered output of said phase detector to the second voltage-controlled oscillator; and means for equally setting dividing factors of said first and second variable frequency dividers.

9. A receiver as claimed in claim 8, wherein said setting means comprises a read only memory.

10. A receiver as claimed in claim 1, wherein said low-pass filter comprises a gyrator circuit and a capacitor connected to an output terminal of said gyrator circuit.

11. A receiver as claimed in claim 10, wherein said gyrator circuit comprises:

first and second transconductance amplifier stages, each having first and second input terminals and an output terminal, the first input terminal of the first transconductance amplifier stage being connected to the second input terminal of the second transconductance amplifier stage, and the output terminal of the second transconductance amplifier stage being connected to the second input terminal of the first transconductance amplifier stage;

third and fourth transconductance amplifier stages, each having first and second input terminals and an output terminal, the first input terminal of the third transconductance amplifier stage being connected to the second input terminal of the fourth transconductance amplifier stage, and the output terminal of the fourth transconductance amplifier stage being connected to the second input terminal of the third transconductance amplifier stage and to the output terminal of said first transconductance amplifier stage, the first capacitor being connected to the first input of the fourth transconductance amplifier stage;

a second capacitor connected to the second input terminal of said third transconductance amplifier stage; and means for biasing the first input terminals of the first and third transconductance amplifier stages and biasing the second input terminals of the second and fourth transconductance amplifier stages.

12. A receiver for receiving a frequency shift keyed (FSK) signal on a radio-frequency carrier, which includes a frequency deviation, comprising:

first and second channel paths to which the received FSK signals are applied, each channel path including a mixer circuit, a low-pass filter connected to the mixer circuit, and a limiting amplifier connected to the low-pass filter;

a first voltage-controlled oscillator for generating a first local carrier;

a phase shifter for producing local carriers in quadrature phase relationship from the local carrier supplied from the first voltage-controlled oscillator and respectively applying the quadrature local carriers to the mixer circuits;

a frequency detector coupled to one of the limiting amplifiers for generating a signal representative of a variation frequency of the received FSK signal, said variation frequency equaling the deviation frequency of said radio-frequency carrier minus an offset between the radio-frequency carrier and the local carrier;

an average circuit for averaging the signal from the frequency detector and producing a signal representative of the deviation frequency of the received radio signal;

a comparator circuit for detecting whether the signal from the frequency detector lies in or outside of the neighborhood of a frequency represented by the signal from the average circuit; and a ramp generator for periodically generating a ramp voltage of constant amplitude when the signal from the frequency detector is detected as lying outside of said neighborhood and holding said ramp voltage at an instantaneous value when said signal is detected as lying in said neighborhood, said voltage-controlled oscillator being representative to an output voltage of said ramp generator to control the frequency of said local carrier.

13. A receiver as claimed in claim 12, wherein said first voltage-controlled oscillator is a voltage-controlled crystal oscillator.

14. A receiver as claimed in claim 13, wherein said comparator circuit comprises:

an offset circuit for establishing high and low reference voltages respectively above and below a voltage represented by the signal from the average circuit; and means for detecting whether said signal from the frequency detector lies in or outside of a range between said high and low reference voltages.

15. A receiver as claimed in claim 13, wherein said frequency detector comprises an edge detector for generating a pulse at a transition of each pulse supplied from one limiting amplifier, and a second low-pass filter for low-pass filtering said pulse generated by said edge detector.

16. A receiver as claimed in claim 13, wherein said average circuit comprises a first-order integrator having a time constant greater than a reciprocal of transmission rate of the received signal.

17. A receiver as claimed in claim 13, wherein said ramp generator is oscillated so that there is at least one ramp voltage during a symbol interval.

18. A receiver as claimed in claim 17, wherein said ramp generator comprises:
   a capacitor connected to the control input of said first voltage-controlled local oscillator,
   first and second comparators for comparing a voltage developed in said capacitor with high and low thresholds and generating a first signal when said voltage is higher than the high threshold and a second signal when said voltage is lower than the low threshold;
   a latch circuit for assuming a first logic state in response to said first signal and a second logic state in response to said second signal;
   series-connected first and second constant current sources respectively responsive to said first and second logic states, a junction between said first and second constant current sources being coupled to said capacitor for causing it to be respectively charged and discharged in response to said logic state; and
   switch means for causing said constant current sources to present an open circuit to said capacitor if said signal is detected as lying in said neighborhood.

19. A receiver as claimed in claim 14, further comprising a phase-locked loop connected between the output of the first voltage-controlled crystal oscillator and said phase shifter, comprising:
   a second voltage-controlled oscillator for supplying a second local carrier to said phase shifter based upon said first local carrier;
   first and second variable frequency dividers connected respectively to outputs of the first voltage-controlled crystal oscillator and said second voltage-controlled oscillator;
   a phase detector for detecting a difference in phase between outputs of the first and second variable frequency dividers;
   a low-pass filter for applying a filtered output of said phase detector to the second voltage-controlled oscillator; and
   means for equally setting dividing factors of said first and second variable frequency dividers.

20. A receiver as claimed in claim 19, wherein said setting means comprises a read only memory.

21. A receiver as claimed in claim 13, wherein each of said low-pass filters comprises a gyrator circuit and a capacitor connected to an output terminal of said gyrator circuit.

22. A receiver as claimed in claim 21, wherein said gyrator circuit comprises:
   first and second transconductance amplifier stages, each having first and second input terminals and an output terminal, the first input terminal of the first transconductance amplifier stage being connected to the second input terminal of the second transconductance amplifier stage, and the output terminal of the second transconductance amplifier stage being connected to the second input terminal of the first transconductance amplifier stage;
   third and fourth transconductance amplifier stages, each having first and second input terminals and an output terminal, the first input terminal of the third transconductance amplifier stage being connected to the second input terminal of the fourth transconductance amplifier stage, and the output terminal of the fourth transconductance amplifier stage being connected to the second input terminal of the third transconductance amplifier stage and to the output terminal of said first transconductance amplifier stage, the first capacitor being connected to the first input of the fourth transconductance amplifier stage;
   a second capacitor connected to the second input terminal of said third transconductance amplifier stage; and
   means for biasing the first input terminals of the first and third transconductance amplifier stages and biasing the second input terminals of the second and fourth transconductance amplifier stages.

23. A receiver as claimed in claim 13, further comprising a power saving circuit for cutting off power supplies to one of said channel paths when said signal is detected as lying outside of the neighborhood of said average value.

24. A receiver for receiving a frequency shift keyed (FSK) signal on a radio-frequency carrier, comprising:
   first and second channel paths to which the received FSK signal is applied, said first and second channel paths including respectively first and second mixer conduits, first and second low-pass filters respectively connected to the first and second mixer circuits, and first and second limiting amplifiers respectively connected to the first and second low-pass filters;
   voltage-controlled oscillator means for generating a local carrier;
   phase shifter means for producing local carriers in quadrature phase relationship from the local carrier supplied from the voltage-controlled oscillator and respectively applying the quadrature local carriers to the first and second mixer circuits;
   frequency control means connected to said first limiting amplifier for detecting frequency fluctuations in said local carrier generated by the oscillator means with respect to a representative of said frequency fluctuations and supplying said control signal to said oscillator means to remove said frequency fluctuations; and
   demodulator means coupled to said first and second limiting amplifiers for demodulating said received FSK signal to produce a demodulated signal.

25. A receiver as claimed in claim 24, further comprising local carrier frequency setting means connected to the output of said frequency control means for setting the frequency of said local carrier of said voltage-controlled oscillator means substantially at the frequency of said FSK signal.

26. A receiver as claimed in claim 24, further comprising power saving circuit mans for cutting off power supplies to the circuits on said second channel path when said frequency control means is in a hunting mode.

* * * * *

UNITED STATES PATENT AND TRADEMARK OFFICE
CERTIFICATE OF CORRECTION

PATENT NO. : 5,091,921
DATED : February 25, 1992
INVENTOR(S) : Yoichiro Minami It is certified that error appears in the above-identified patent and that said Letters Patent is hereby corrected as shown below:

col. 3, line 59, delete "limting" and insert --limiting--.

col. 4, line 13, delete "1-$F_D$-$\Delta$F1" and insert --,$|F_D-\Delta F|$--.

col. 10, line 44, delete "representative" and insert --responsive--.

col. 12, line 31, delete "conduits" and insert --circuits--.

col. 12, line 46, after "a" insert --frequency of the received FSK signal to generate a control signal--.

Signed and Sealed this

Twenty-second Day of June, 1993

Attest:

MICHAEL K. KIRK

Attesting Officer

Acting Commissioner of Patents and Trademarks